(12) United States Patent
Hong et al.

(10) Patent No.: US 7,633,564 B2
(45) Date of Patent: Dec. 15, 2009

(54) TOUCH PANEL FOR DISPLAY DEVICE AND METHOD OF FABRICATING THE SAME

(75) Inventors: Hee Jung Hong, Seoul (KR); Hwan Seong Yu, Kyongsangbuk-do (KR); Byeong Hyeon Ahn, Kyongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 532 days.

(21) Appl. No.: 10/742,911

(22) Filed: Dec. 23, 2003

(65) Prior Publication Data
US 2004/0222974 A1 Nov. 11, 2004

(30) Foreign Application Priority Data
Dec. 31, 2002 (KR) ............ 10-2002-0087769

(51) Int. Cl.
*G02F 1/1335* (2006.01)
*G02F 1/1345* (2006.01)
(52) U.S. Cl. ................................ 349/12; 349/150
(58) Field of Classification Search ........... 349/12, 349/150; 345/172, 173
See application file for complete search history.

(56) References Cited

U.S. PATENT DOCUMENTS

| | | | | |
|---|---|---|---|---|
| 5,436,744 | A * | 7/1995 | Arledge et al. | 349/150 |
| 6,160,967 | A | 12/2000 | Mizobuchi | |
| 6,191,838 | B1 * | 2/2001 | Muramatsu | 349/149 |
| 6,529,179 | B1 * | 3/2003 | Hashimoto et al. | 345/87 |
| 6,570,707 | B1 * | 5/2003 | Murakami et al. | 359/497 |
| 6,590,622 | B1 * | 7/2003 | Nakanishi et al. | 349/12 |
| 6,781,642 | B2 * | 8/2004 | Nakanishi et al. | 349/12 |
| 6,853,361 | B2 * | 2/2005 | Tsuyuki et al. | 345/92 |
| 6,972,966 | B1 * | 12/2005 | Oishi et al. | 361/803 |

(Continued)

FOREIGN PATENT DOCUMENTS

JP 06-233196 8/1994

(Continued)

OTHER PUBLICATIONS

Communication from Japanese Patent Office dated May 15, 2006.

*Primary Examiner*—David Nelms
*Assistant Examiner*—Nathanael R Briggs
(74) *Attorney, Agent, or Firm*—McKenna Long & Aldridge LLP

(57) ABSTRACT

A touch panel for a display device and a method of fabricating the same are disclosed. The touch panel for the display device includes upper and lower substrates, first and second transparent electrodes on opposing surfaces of the upper and lower substrates, a plurality of metal electrodes in a circumference of the first and second transparent electrodes, and a flexible printed cable having a plurality of signal applying lines extended from the upper and lower substrates to a rear side of the display device for applying signal voltages to the metal electrodes, wherein the flexible printed cable is bent at a corner of the upper and lower substrates from a top to a bottom of the display device, and has a first part extended from the corner of the display device and a second part extended from the first part and the first and second parts being perpendicular to each other.

10 Claims, 8 Drawing Sheets

U.S. PATENT DOCUMENTS

| | | |
|---|---|---|
| 2001/0043291 A1 * | 11/2001 | Kono et al. .................. 349/12 |
| 2002/0054261 A1 | 5/2002 | Sekiguchi |
| 2002/0090798 A1 | 7/2002 | Ahn et al. |
| 2002/0098612 A1 | 7/2002 | Ahn et al. |

FOREIGN PATENT DOCUMENTS

| | | |
|---|---|---|
| JP | 11-249215 | 9/1999 |
| JP | 2000-207128 | 7/2000 |
| JP | 2002-182854 | 6/2002 |

* cited by examiner

TOUCH PANEL FOR DISPLAY DEVICE AND METHOD OF FABRICATING THE SAME

This application claims the benefit of the Korean Patent Application No. P2002-087769 filed on Dec. 31, 2002, which is hereby incorporated by reference.

BACKGROUND OF THE INVENTION

1. Field of the Invention

The present invention relates to a touch panel, and more particularly, to a touch panel for a display device and a method of fabricating the same. Although the present invention is suitable for a wide scope of applications, it is particularly suitable for preventing an electrostatic discharge.

2. Discussion of the Related Art

In order to efficiently use various electronic devices, touch panels have been widely used to input signals on display surfaces without additional remote controllers or other input devices. The touch panels have been widely integrated with display surfaces of flat display devices such as electronic calculators, liquid crystal display (LCD) devices, plasma display panel (PDP) devices, electroluminescence (EL) devices, and cathode ray tubes (CRTs). By integrating the touch panels with display devices, a user can select desired information while watching an image displayed on the display device.

Depending upon a sensing method when a user touches a display surface, the touch panels may be classified into a resistive type, an electromagnetic type, a capacitor type, an infrared type, and a light sensor type.

Among the various type touch panels, the resistive type touch panel includes an upper transparent substrate having an upper electrode, and a lower transparent substrate having a lower electrode. The lower and upper transparent substrates are bonded to each other at a constant interval. Accordingly, if the surface of the upper transparent substrate is touched at a predetermined point using input means, e.g., a finger, a pen, and etc., the upper electrode formed on the upper transparent substrate is electrically connected to the lower electrode formed on the lower transparent substrate. A voltage change by a resistance value or a capacitance value of the touched point is then detected and output along with a location defined by coordinates of the touched point.

The related art analog resistive type touch panel will be described with reference to the accompanying drawings. FIG. 1 is a block diagram illustrating how a signal is applied for the operation of the related art touch panel. As shown in FIG. 1, a touch panel 100 is positioned on an LCD device 130 having a backlight 140, in which transparent electrodes are formed on opposing surfaces of lower and upper substrates, and metal electrodes are formed for providing signal voltages to the transparent electrodes according to the X-axis and Y-axis directions. Then, the electrodes are connected to a touch panel controller 110 for applying the signal voltages to the metal electrodes of the touch panel 100, or reading the voltage of a touching point. Also, the touch panel controller 110 is connected to a micro-computer 120 for controlling the entire system including a display device.

Hereinafter, a touch panel for an LCD device according to the related art will be described with reference to the accompanying drawings.

FIG. 2 is a plane view schematically illustrating the related art touch panel. FIGS. 3A and 3B are plane views illustrating metal electrodes and signal applying line application on respective upper and lower substrates of FIG. 2. FIG. 4 is a cross-sectional view taken along line IV-IV of FIG. 2. FIG. 5 is a cross-sectional view taken along line V-V of FIG. 2. FIG. 6 is a cross-sectional view taken along line VI-VI of FIG. 2.

As mentioned above, the related art touch panel for the display device is used as a means for inputting signals on the display surface of the LCD device. Referring to FIG. 2, the related art touch panel for the display device includes a viewing area corresponding to the display surface of the display device, and a dead space region 20 corresponding to the circumference of the viewing area surrounding the viewing area. With this configuration, the upper and lower transparent substrates are bonded to each other through an insulating adhesive provided in the dead space region 20. That is, rectangular upper and lower PET (polyethylene terephtalate) substrates 1 and 2 corresponding to the display surface of the display device are formed to face into each other, and then first and second transparent electrodes 3 and 4 are respectively formed on the upper and lower PET substrates 1 and 2. Then, the upper and lower PET substrates 1 and 2 are bonded to each other by the insulating adhesive provided in the dead space region 20 at a predetermined interval.

Accordingly, if a predetermined portion of the upper PET substrate 1 is touched with a pen or a finger, the first and second transparent electrodes 3 and 4 are also electrically connected to each other at the predetermined portion, so that a voltage, varied by a resistance or a resistance value of the touching point, is detected and output. In order to detect the voltage output by the resistance value or the capacitance value at the predetermined portion, a signal applying line is connected to apply a voltage to the first and second transparent electrodes 3 and 4, and to read the voltage value varied by the touching point. The signal applying line is connected to the first and second transparent electrodes 3 and 4 in the dead space region 20.

The related art touch panel for the display device will be explained in more detail with reference to the plane and cross-sectional views described below.

Referring to FIGS. 3A and 3B, and FIGS. 4 to 6, the transparent upper and lower PET substrates 1 and 2 are formed to have a size and a shape corresponding to the display surface of the display device. The first and second transparent electrodes 3 and 4 are formed on each opposing surface of the upper and lower PET substrates 1 and 2. Then, metal electrodes (e.g., Ag paste) are formed in the dead space region 20. Referring to FIG. 3A, first and second metal electrodes 5a and 5b are formed in the dead space region 20 at the left and right sides of the upper PET substrate to be connected to the first transparent electrode 3. The first and second metal electrodes 5a and 5b are connected to first and second signal applying lines 5c and 5d directly connected to external power sources Vcc and Vss for applying voltage signals from the external.

Herein, as shown in FIGS. 4 and 5, the first and second metal electrodes 5a and 5b are electrically connected to the transparent electrode 3, so that the first and second metal electrodes 5a and 5b are directly formed on the transparent electrode 3. However, the second signal applying line 5d is electrically connected to the second metal electrode 5b, as shown in FIG. 4, and electrically insulated from the transparent electrode 3. In this respect, a first insulating layer 10a is formed between the transparent electrode 3 and the electrode having the second signal applying line 5d. As shown in the second signal applying line 5d, the first signal applying line 5c is directly connected to the first metal electrode 5a for applying the voltage signal, and an insulating layer is formed between the transparent electrode 3 and the electrode having the first signal applying line 5c.

Accordingly, the first and second signal applying lines 5c and 5d are bonded to flexible printed cable (FPC) 7 at one portion of the substrate by a conductive adhesive 8a, so that the external voltage signals are applied to the first and second metal electrodes 5a and 5b through the first and second signal applying lines 5c and 5d. Also, as shown in FIG. 3B, third and fourth metal electrodes 6a and 6b are formed in the dead space region 20 at the lower and upper sides of the lower PET substrate 2 to be connected to the transparent electrode 4, and third and fourth signal applying lines 6c and 6d are formed in the dead space region 20 at the left side of the lower PET substrate 2 to be electrically connected the third and fourth metal electrodes 6a and 6b to the FPC 7. Referring to FIG. 4, as shown in the first and second signal applying lines 5c and 5d, a second insulating 10b is formed between the transparent electrode 4 and the signal applying line 6c to electrically insulate the signal applying line 6c from the transparent electrode 4. Also, the FPC 7 is connected to the third and fourth metal electrodes 6a and 6b in the dead space region 20 through the third and fourth signal applying lines 6c and 6d.

The first and second signal applying lines 5c and 5d are printed on the upper surface of the FPC 7, and the third and fourth signal applying lines 6c and 6d are printed on the lower surface of the FPC 7. As shown in FIG. 6, the first, second, third, and fourth signal applying lines 5c, 5d, 6c, and 6d are bonded by the conductive adhesives 8a and 8b. The first to fourth signal applying lines 5c, 5d, 6c, and 6d printed on the upper and lower surfaces of the FPC 7 output the voltage to the transparent electrode 3 or 4 when applying the power supply voltage Vcc and the ground voltage GND to the first to fourth metal electrodes 5a, 5b, 6a, and 6b of the transparent electrode 3 or 4, or electrically connecting the upper and lower transparent electrodes 3 and 4 to each other at a predetermined portion.

As mentioned above, the first to fourth signal applying lines 5c, 5d, 6c, and 6d are bonded to the FPC 7 by the conductive adhesives 8a and 8b, and the upper and lower substrates 1 and 2 are bonded to each other in the dead space region without the FPC 7 by an insulating adhesive 9.

A method for electrically bonding the first to fourth signal applying lines 5c, 5d, 6c, and 6d to the FPC 7 will now be explained in detail. First, the conductive adhesive 8a is positioned below the first and second signal applying lines 5c and 5d bonded to the upper surface of the FPC 7, and the conductive adhesive 8b is positioned on the third and fourth signal applying lines 6c and 6d bonded to the lower surface of the FPC 7. Next, the insulating adhesive 9 is deposited in the dead space region 20 except for the portion of the dead space region occupied by the FPC 7. Subsequently, only the portion of the FPC 7 on which the conductive adhesive is formed is heated at a temperature of approximately 100° C., and pressed by the external force. Thus, the FPC 7 is bonded to the first to fourth signal applying lines 5c, 5d, 6c, and 6d, and the lower and upper substrates 1 and 2 are bonded to each other.

The operation of the touch panel for the display device according to the related art will be explained as follows.

If the surface of the upper substrate 1 is touched at the predetermined portion with a pen or a finger, the first and second transparent electrodes 3 and 4 become electrically connected to each other at the predetermined portion. Accordingly, the power supply voltage (Vcc) and the ground voltage (GND) are applied to the right and left sides of the first transparent electrode 3 formed on the upper PET substrate 1 through the two signal applying lines 5c and 5d printed on the upper surface of the FPC 7 and the metal electrodes 5a and 5b. A voltage, having a value varied by a resistance value or a capacitance value specific to the touch point, is then outputted through the second transparent electrode 4 of the lower PET substrate 2 and the metal electrodes 6a and 6b, and the two signal applying lines 6c and 6d printed on the lower surface of the FPC 7, so that the X-axis coordinates are detected.

Next, the power supply voltage Vcc and the ground voltage GND are applied to the upper and lower sides of the second transparent electrode 4 formed on the lower PET substrate 2 through the two signal applying lines 6c and 6d printed on the lower surface of the FPC 7 and the metal electrodes 6a and 6b. Then, the voltage value is then output at the touching point by the first transparent electrode 3 and the metal electrodes 5a and 5b of the upper PET substrate 1, so that the Y-axis coordinates are detected. Accordingly, the X-Y coordinates of the touching point are detected.

FIG. 7 illustrates an FPC, to which a signal applying line of the related art touch panel is bonded, to the rear side of a lower substrate in a display device. FIG. 8 is an expanded view of FIG. 7 illustrating a contact hole of the FPC. FIG. 9 is a cross-sectional view taken along line IX-IX of FIG. 8.

As mentioned above, as shown in FIG. 7, the FPC 7 and the first to fourth signal applying lines 5c, 5d, 6c, and 6d bonded to the upper and lower surfaces of the FPC 7 are bent to the side of the touch panel, and pass through the rear side 60 of an LCD panel integrated with the touch panel, so that the FPC 7 passes through a driver IC 51 connected to a printed circuit board (PCB). In this case, as shown in FIG. 8, the driver IC 51 may be in direct contact with the third and fourth signal applying lines 6c and 6d bonded to the lower surface of the FPC 7 among the signal applying lines bonded to the FPC 7, thereby causing a short-circuit of the driver IC 51. Especially, when performing a shock test for preventing an electrostatic discharge (ESD), a short-circuit of the driver IC is generated.

As shown in FIG. 8, the FPC 7 passing through the PCB 50 is connected to a touch panel controller (not shown) to input and output the signal voltage to the transparent electrode of the touch panel. A through-hole 55 is formed in the FPC 7 to facilitate a connection to the touch panel controller, so that the third and fourth signal applying lines 6c and 6d of the lower surface of the FPC 7 are formed to the upper surface of the FPC 7. However, as shown in FIG. 9 of a cross-sectional view taken along line IX-IX of FIG. 8 for illustrating a portion prior to forming the through-hole 55, the first and second signal applying lines 5c and 5d are formed on the upper surface of the FPC 7, and the third and fourth signal applying lines 6c and 6d are formed on the lower surface of the FPC 7. As a result, the third and fourth signal applying lines 6c and 6d formed on the lower surface of the FPC 7 may be in contact with the driver IC.

Accordingly, the related art touch panel for the display device has the following disadvantages.

In the related art touch panel for the display device, the FPC is formed to apply the signal to the metal electrodes on the transparent electrode. When the FPC is bent to the bottom of the LCD device, some of the signal applying lines bonded to the FPC may be in direct contact with the driver IC of the LCD device, so that the driver IC may be damaged during a shock test for preventing an electrostatic discharge (ESD).

SUMMARY OF THE INVENTION

Accordingly, the present invention is directed to a touch panel for a display device and a method of fabricating the same that substantially obviate one or more of problems due to limitations and disadvantages of the related art.

Another object of the present invention is to provide a touch panel for a display device and a method of fabricating the samethat prevents an electrostatic discharge generated when a flexible printed cable (FPC) with bonded signal applying lines is bent, so that the signal applying lines bonded to the FPC are in direct contact with a driver IC of a display device.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a touch panel for a display device having a driver IC includes upper and lower substrates, first and second transparent electrodes on opposing surfaces of the upper and lower substrates, a plurality of metal electrodes in a circumference of the first and second transparent electrodes, and a flexible printed cable having a plurality of signal applying lines extended from the upper and lower substrates to a rear side of the display device for applying signal voltages to the metal electrodes, wherein the flexible printed cable is bent at a corner of the upper and lower substrates from a top to a bottom of the display device, and has a first part extended from the corner of the display device and a second part extended from the first part and the first and second parts being perpendicular to each other.

The flexible printed cable has a plurality of through-holes before the flexible printed cable overlaps the driver IC. The signal applying lines of the lower surface of the flexible printed cable are disposed on the upper surface of the flexible printed cable.

Also, the flexible printed cable extends through the driver IC of the display device to be connected to a printed circuit board.

The signal applying lines for applying signals to the metal electrodes on the upper substrate are printed on the upper surface of the flexible printed cable, and the signal applying lines for applying signals to the metal electrodes on the lower substrate are printed on the lower surface of the flexible printed cable.

The metal electrodes include first and second metal electrodes being electrically connected to the first transparent electrode in the circumference of the first transparent electrode along the X-axis direction, and third and fourth metal electrodes being electrically connected to the second transparent electrode in the circumference of the upper and lower sides on the second transparent electrode along the Y-axis direction.

Also, the first, second, third, and fourth metal electrodes are connected to the first, second, third, and fourth signal applying lines.

The display device is an LCD device.

In another aspect of the present invention, a method of fabricating a touch panel for a display device having a driver IC includes forming upper and lower substrates, forming first and second transparent electrodes on opposing surfaces of the upper and lower substrates, forming a plurality of metal electrodes in a circumference of the first and second transparent electrodes, and forming a flexible printed cable having a plurality of signal applying lines extended from the upper and lower substrates to a rear side of the display device for applying signal voltages to the metal electrodes, wherein the flexible printed cable is bent at a corner of the upper and lower substrates from a top to a bottom of the display device, and has a first part extended from the corner of the display device and a second part extended from the first part and the first and second parts being perpendicular to each other.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

A touch panel according to the present invention will be described with reference to the accompanying drawings.

Figure 1:
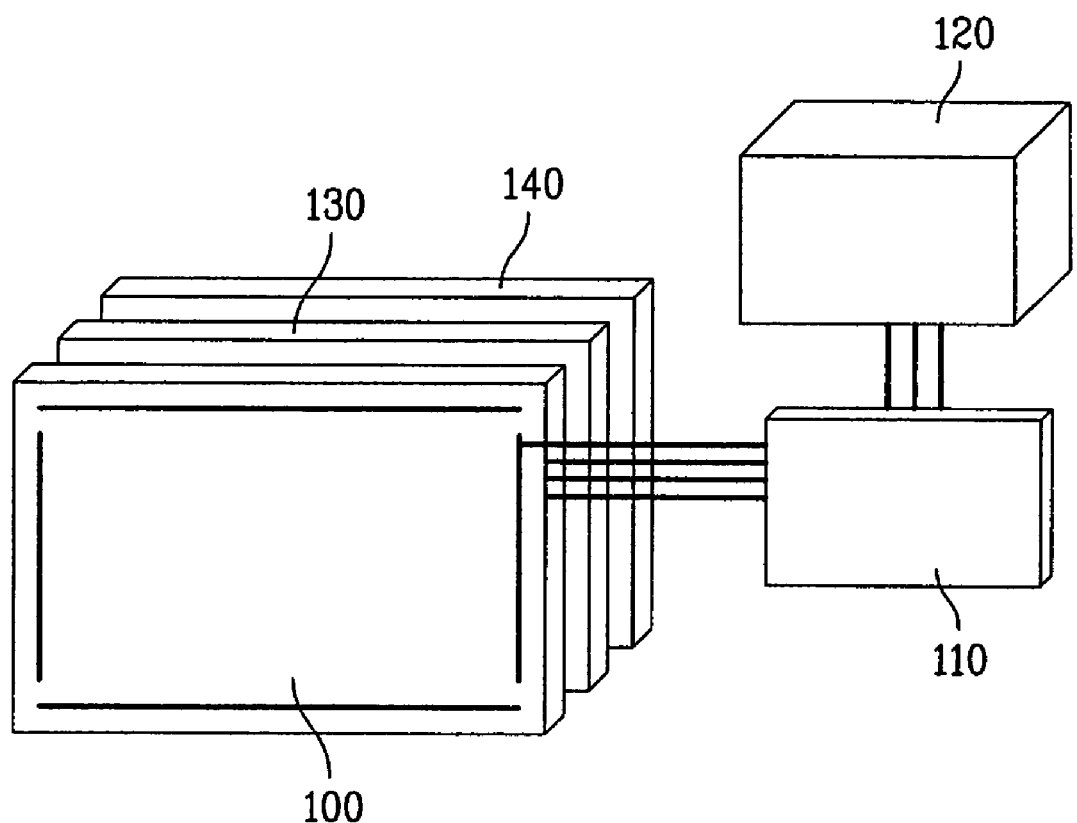
FIG. 1 is a block diagram illustrating the signal applying lines in the related art touch panel.
Figure 2:
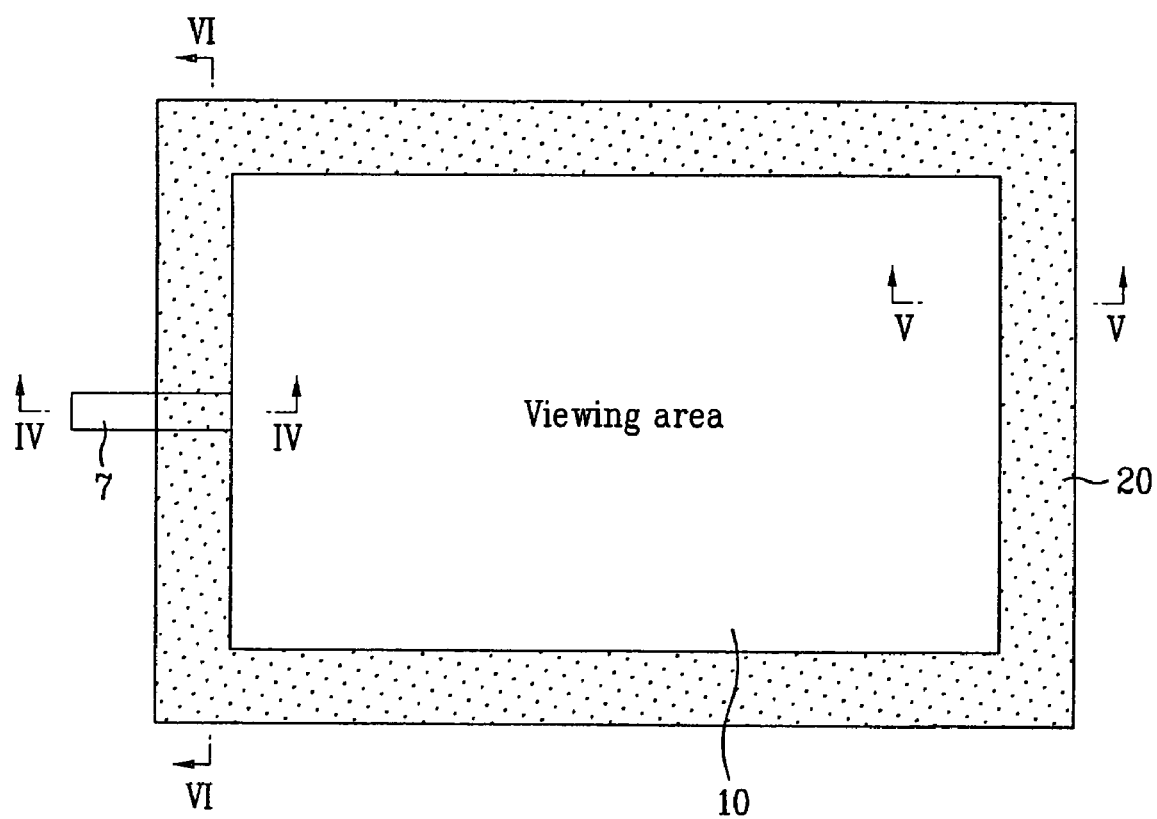
FIG. 2 is a plane view schematically illustrating the related art touch panel.
Figure 3A:
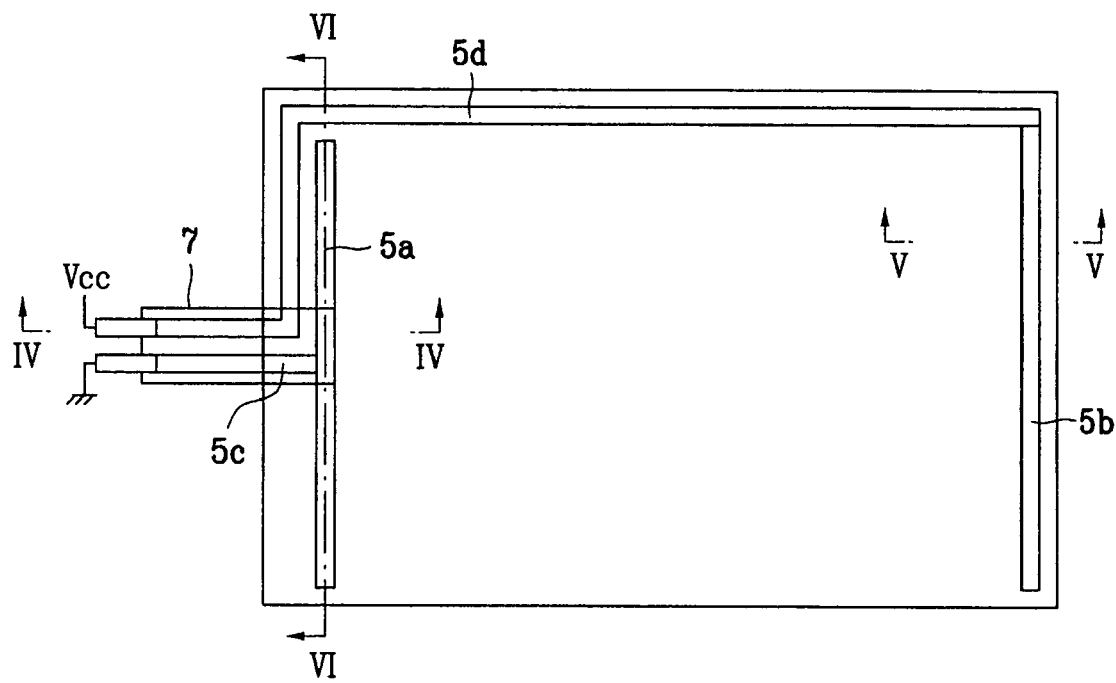
FIGS. 3A and 3B are plane views illustrating metal electrodes and signal applying lines on upper and lower substrates of FIG. 2.
Figure 3B:
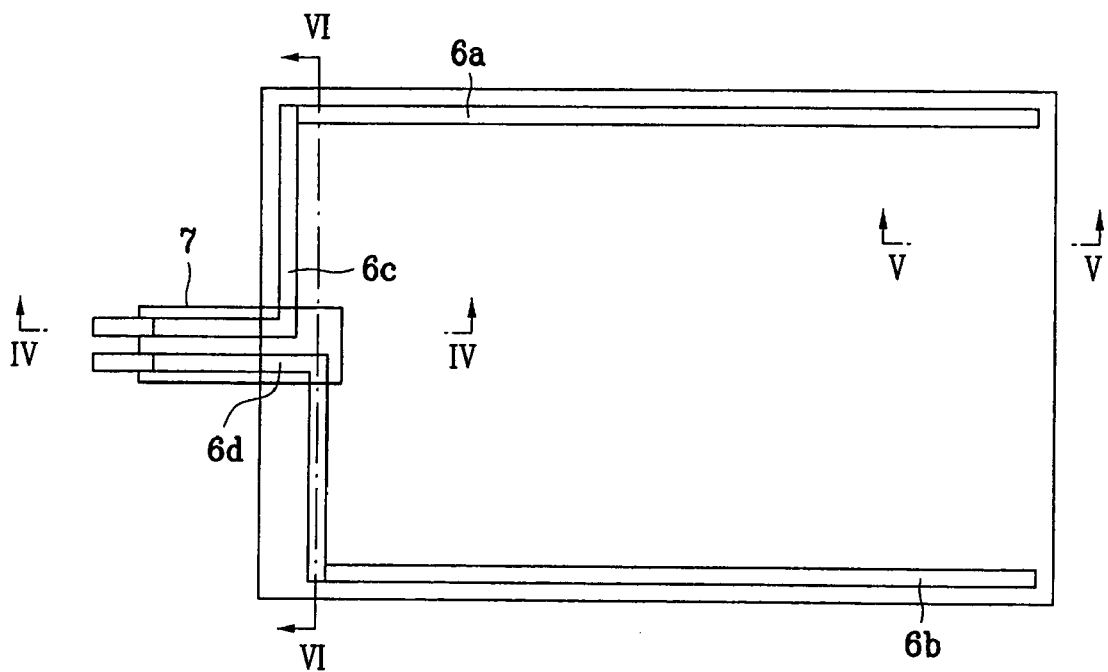
Figure 4:
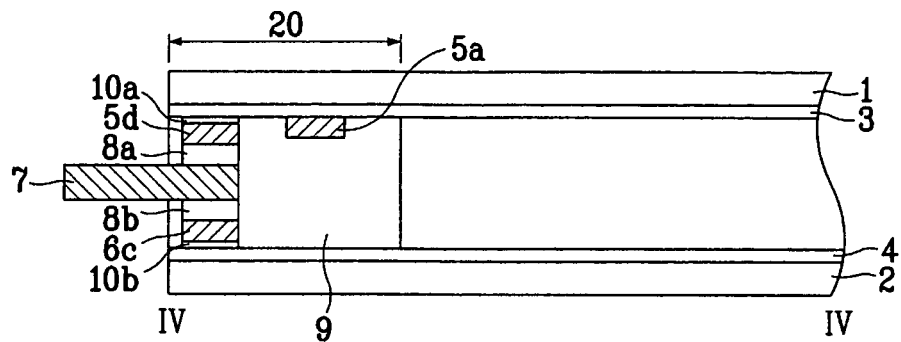
FIG. 4 is a cross-sectional view taken along line IV-IV of FIG. 2.
Figure 5:
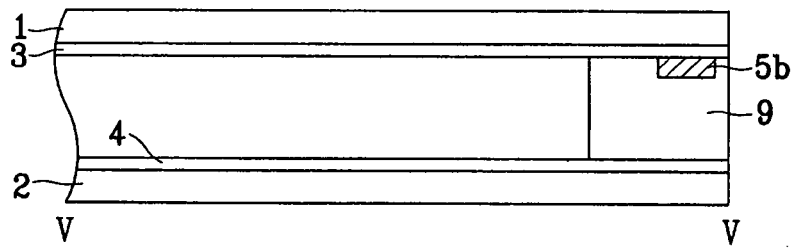
FIG. 5 is a cross-sectional view taken along line V-V of FIG. 2.
Figure 6:
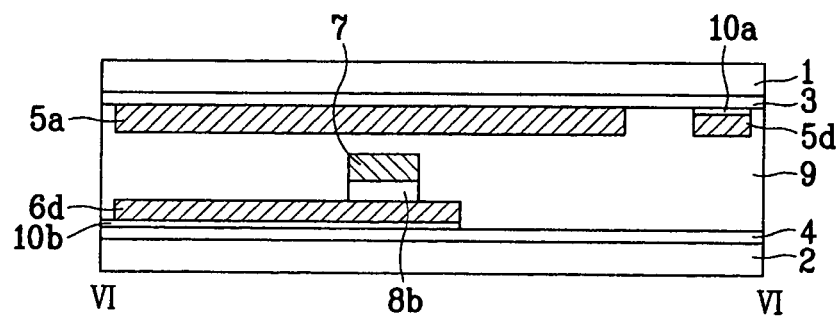
FIG. 6 is a cross-sectional view taken along line VI-VI of FIG. 2.
Figure 7:
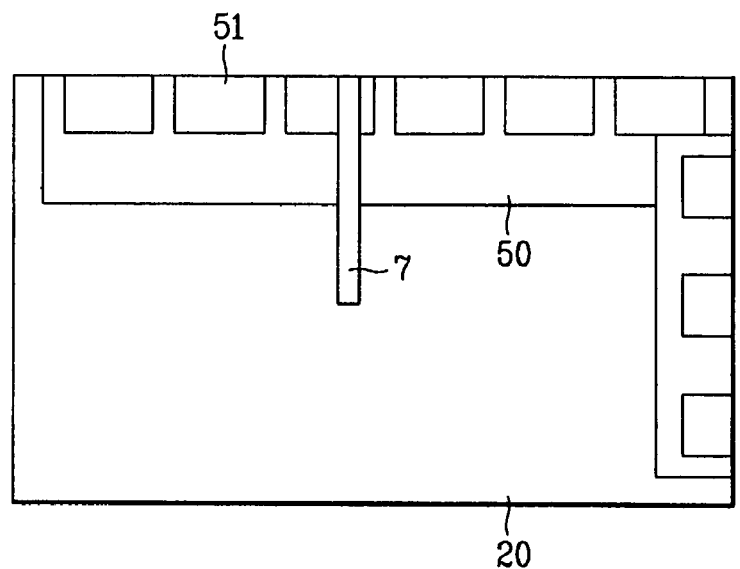
FIG. 7 illustrates a bent FPC with a bonded signal applying line in the related art touch panel passing to the rear side of the lower substrate in the display device.
Figure 8:
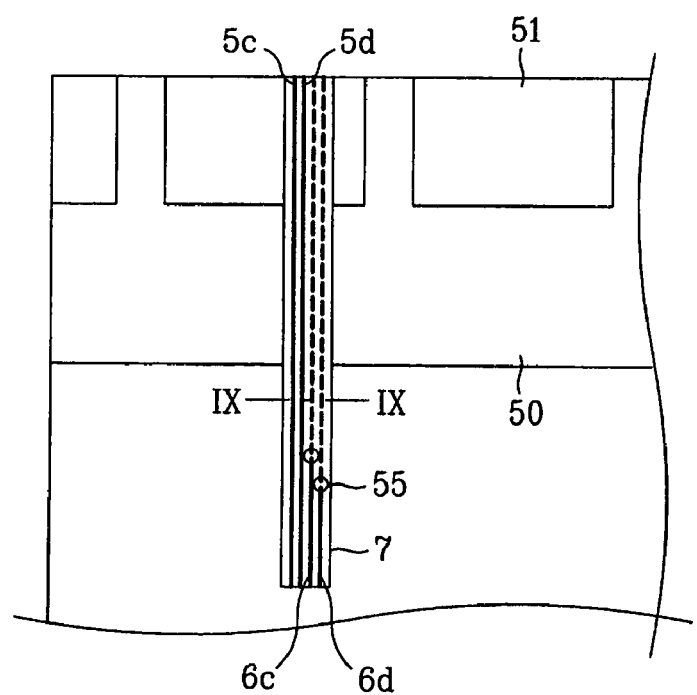
FIG. 8 is an expanded view of FIG. 7 illustrating a contact hole of the FPC.
Figure 9:
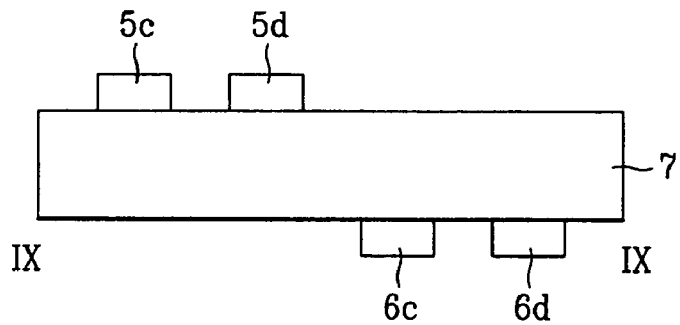
FIG. 9 is a cross-sectional view taken along line IX-IX of FIG. 8.
Figure 10A:
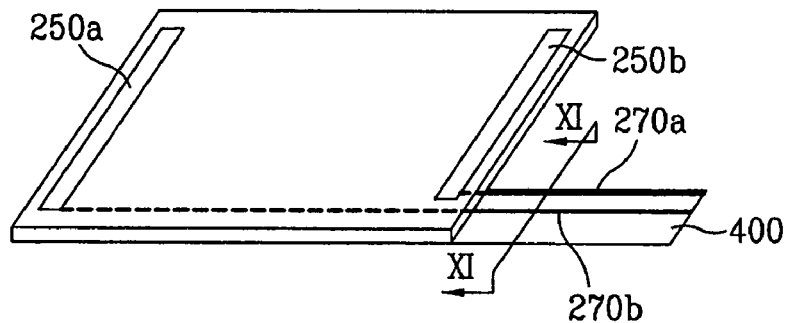
FIGS. 10A and 10B are plane views illustrating metal electrodes and signal applying lines on upper and lower substrates of a touch panel according to the present invention.
Figure 10B:
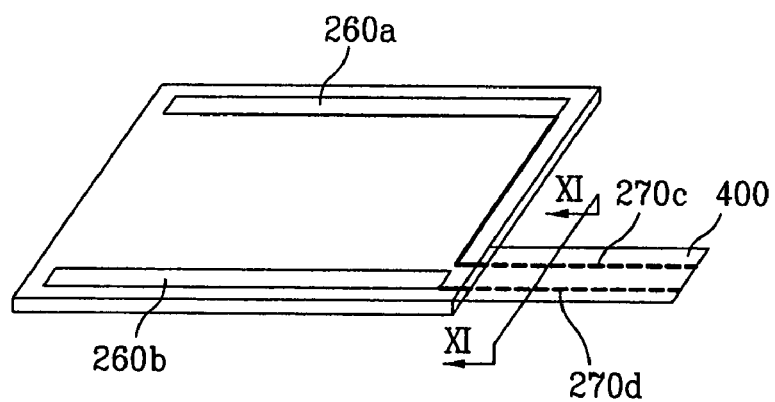
Figure 11:
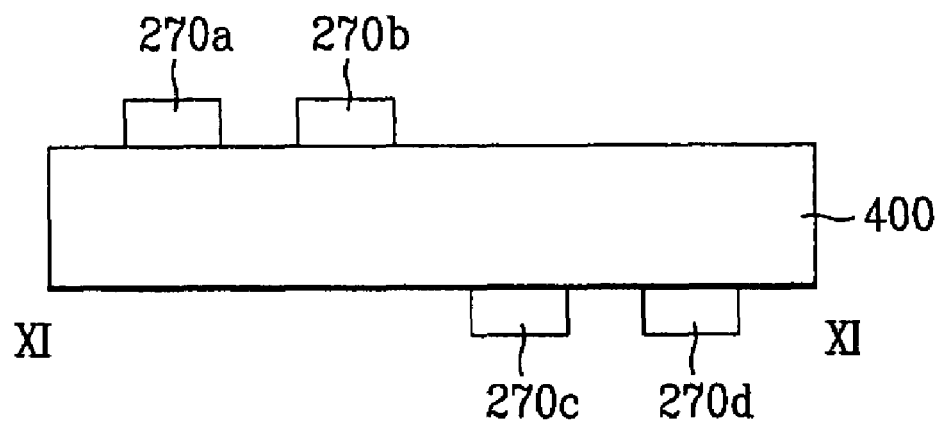
FIG. 11 is a cross-sectional view taken along line XI-XI of FIGS. 10A and 10B.

FIGS. 10A and 10B are plane views illustrating metal electrodes and signal applying lines on respective upper and lower substrates of a touch panel according to the present invention. FIG. 11 is a cross-sectional view taken along line XI-XI of FIGS. 10A and 10B.

The touch panel according to the present invention has the same structure as that of the related art except for the locations of signal applying lines. Accordingly, in the touch panel according to the present invention, upper and lower substrates of PET films are formed to face into each other where a viewing area and a non-viewing area (dead space region) are formed thereon. The non-viewing area is the circumference of the viewing area and surrounds the viewing area. Then, transparent electrodes are formed on the opposing surfaces of the upper and lower substrates, and a plurality of electrodes are formed in the non-viewing area (dead space region) of the transparent electrodes.

Referring to FIG. 10A, the transparent electrode (not shown) is formed at the rear side on the upper substrate of the touch panel, and first and second metal electrodes 250a and 250b are formed at both sides of the upper substrate along the X-axis direction to be connected to the transparent electrode. Then, first and second signal applying lines 270a and 270b are connected to the first and second metal electrodes 250a and 250b for applying signal voltages to the first and second metal electrodes 250a and 250b. Also, as shown in FIG. 10B, the transparent electrode (not shown) is formed on the lower substrate, and third and fourth metal electrode 260a and 260b are formed at both sides of the lower substrate along the Y-axis direction to be connected to the transparent electrode. Then, third and fourth signal applying lines 270c and 270d are connected to the third and fourth metal electrodes 260a and 260b for applying signal voltages to the third and fourth metal electrodes 260a and 260b.

As shown in FIGS. 10A and 10B, a flexible printed cable (FPC) 400 is in contact with the lower surface of the upper substrate, and the upper surface of the lower substrate, so that the first and second signal applying lines 270a and 270b are printed on the upper surface of the FPC 400, and the third and fourth signal applying lines 270c and 270d are printed on the lower surface of the FPC 400. Also, the FPC 400 is formed to correspond to one side of the dead space region between the upper and lower substrates, and the upper and lower substrates are bonded to each other by both-sided adhesive.

Before bending the FPC 400 to the bottom of the display device as one body, a cross-sectional view of the FPC 400 will be described with reference to FIG. 11. Referring to FIG. 11, the first and second signal applying lines 270a and 270b connected to the first and second metal electrodes (not shown) on the upper substrate are bonded to the upper surface of the FPC 400, and the third and fourth signal applying lines 270c and 270d connected to the third and fourth metal electrodes (not shown) are bonded to the lower surface of the FPC 400.

Figure 12:
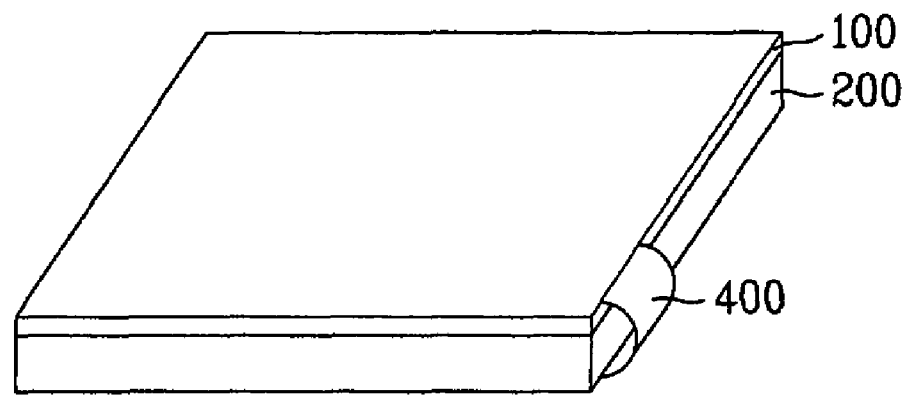
FIG. 12 illustrates a bent signal applying line after bonding a touch panel to a display device.

FIG. 12 illustrates a bent signal applying line after bonding the touch panel to the display device. As shown in FIG. 12, the upper and lower substrates are bonded to each other. Then, the FPC 400 is connected to one side of the dead space region in the touch panel 100, and the touch panel 100 is mounted on the display device 200 such as an LCD device. In this case, the signal applying line is completely bonded to the FPC 400, and then the FPC 400 of the film type that can be easily bent extends over the rear side of the display device 200 along the side of the touch panel 100 and the display device 200 to be connected to a touch panel controller (not shown) formed at the lower side of the display device 200.

Figure 13:
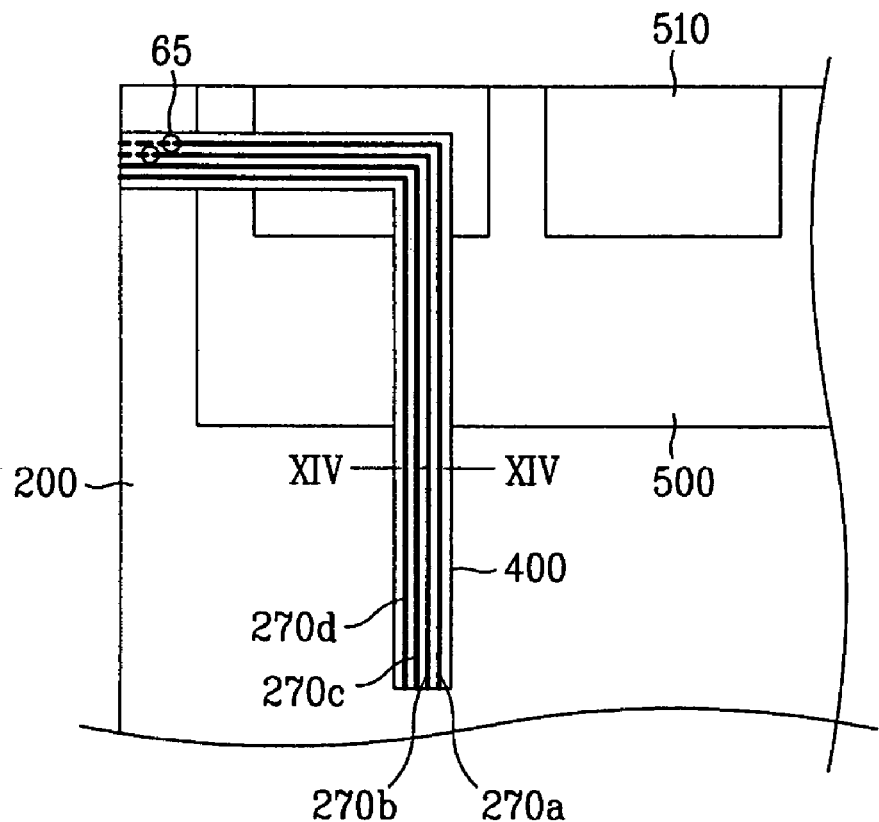
FIG. 13 illustrates a bonded signal applying line when an FPC of a touch panel according to the present invention is bent to the rear bottom of the display device.
Figure 14:
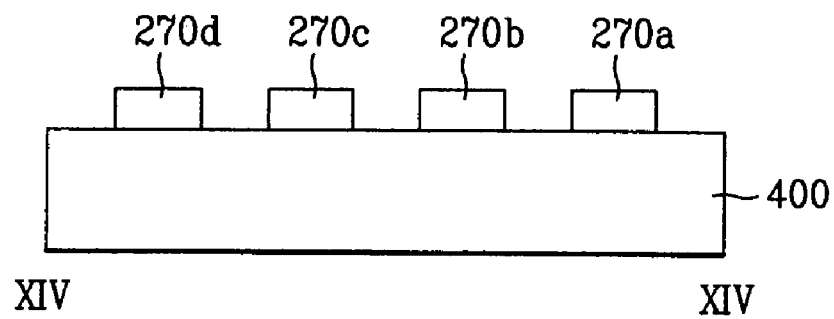
FIG. 14 is a cross-sectional view taken along line XIV-XIV of FIG. 13.

FIG. 13 illustrates a bonded signal applying line when the FPC of the touch panel according to the present invention is bent to the rear bottom of a display device. FIG. 14 is a cross-sectional view taken along line XIV-XIV of FIG. 13.

As shown in FIG. 13, when the FPC 400 formed at one side of the touch panel passes over the rear side of the lower substrate of the display device 200, the FPC 400 is bent in a "]" shape to be connected to the touch panel controller. The FPC 400 overlaps a driver IC 510 and a PCB 500. As shown in the drawings, a through-hole 65 is formed in the FPC 400 prior to overlapping the FPC 400 and the driver IC 510, so that the third and fourth signal applying lines 270c and 270d formed on the lower surface of the FPC 400 extend over the upper surface of the FPC 400.

Accordingly, as shown in FIG. 14, the cross-section of the FPC 400 having the through-hole 65 on the external PCB 500 prior to overlapping the driver IC 510 and the signal applying lines 270a, 270b, 270c, and 270d are positioned on the upper surface of the FPC 400. In such a case, a contact hole of the FPC 400 must not be formed at a portion where a case top surrounds the touch panel and the LCD panel. If the contact hole of the FPC 400 overlaps the portion forming the case top, a short-circuit may be generated between a metal material of the case top and the FPC 400.

As mentioned above, the touch panel for the display device according to the present invention has the following advantages.

In the touch panel for the display device according to the present invention, the FPC is connected to one side of the touch panel. That is, the signal applying lines extend over the upper surface of the FPC by the through-hole to be connected to the touch panel controller. In this case, the through-hole is formed before the FPC overlaps the driver IC, thereby preventing the driver IC from being connected to the signal applying line during a shock test for preventing an electrostatic discharge. As a result, a voltage resisting margin can be reinforced in the present invention.

It will be apparent to those skilled in the art that various modifications and variations can be made in the touch panel for the display device and the method of fabricating the same of the present invention without departing from the spirit or scope of the inventions. Thus, it is intended that the present invention covers the modifications and variations of this invention provided they come within the scope of the appended claims and their equivalents.

What is claimed is:

1. A touch panel for a display device having a driver IC, comprising:
    upper and lower substrates;
    first and second transparent electrodes on opposing surfaces of the upper and lower substrates;
    first and second metal electrodes being electrically connected to the first transparent electrode in the periphery of the first transparent electrode along a first direction, and third and fourth metal electrodes being electrically connected to the second transparent electrode in the periphery of the upper and lower sides on the second transparent electrode along a second direction substantially perpendicular to the first direction;
    a flexible printed cable having a plurality of signal applying lines extended from the upper and lower substrates to a rear side of the display device for applying signal voltages to the metal electrodes, wherein the flexible printed cable has a first bend over an edge of the upper and lower substrates from a top to a bottom of the display device, and has a first part extended from the edge of the display device to connect the signal applying lines to the plurality of metal electrodes, a second part extended from the first part and overlaps the driver IC, and a plurality of through-holes between the first part and the second part,
    wherein the driver IC is arranged on the rear side of the display device for driving the display device and a portion of first signal applying lines of the plurality of signal applying lines on a lower surface of the first part of the flexible printed cable connects to a portion of the first signal applying lines of the plurality of signal applying lines on an upper surface of the second part of the flexible printed cable through the plurality of through holes before the flexible printed cable overlaps the driver IC, wherein the flexible printed cable extends in a first direction from the first bend to overlap the driver IC and the flexible printed cable has a second bend to extend past the driver IC in a second direction over a printed circuit board and connects to a touch panel controller, so that the signal applying lines are not contacted with the driver IC.

2. The touch panel of claim 1, wherein the flexible printed cable extends through the driver IC of the display device to be connected to a printed circuit board.

3. The touch panel of claim 1, wherein the signal applying lines for applying signals to the metal electrodes on the upper substrate are printed on the upper surface of the first part of the flexible printed cable, and the signal applying lines for applying signals to the metal electrodes on the lower substrate are printed on the lower surface of the first part of the flexible printed cable.

4. The touch panel of claim 1, wherein the first, second, third, and fourth metal electrodes are connected to first, second, third, and fourth signal applying lines of the plurality of signal applying lines.

5. The touch panel of claim 1, wherein the display device is a liquid crystal display device.

6. A method of fabricating a touch panel for a display device having a driver IC, comprising:
    forming upper and lower substrates;
    forming first and second transparent electrodes on opposing surfaces of the upper and lower substrates;
    forming first and second metal electrodes being electrically connected to the first transparent electrode in the periphery the first transparent electrode along a first direction, and third and fourth metal electrodes being electrically connected to the second transparent electrode in the periphery of the upper and lower sides on the second transparent electrode along a second direction substantially perpendicular to the first direction; and
    forming a flexible printed cable having a plurality of signal applying lines extended from the upper and lower substrates to a rear side of the display device for applying signal voltages to the metal electrode, wherein the flexible printed cable has a first bend over an edge of the upper and lower substrates from a top to a bottom of the display device, and has a first part extended from the edge of the display device to connect the signal applying lines to the plurality of metal electrodes, a second part extended from the first part and overlaps the driver IC, and a plurality of through-holes between the first part and the second part, the first and second parts being perpendicular to each other;
    wherein the driver IC is arranged on the rear side of the display device for driving the display device and a portion of first signal applying lines of the plurality of signal applying lines on a lower surface of the first part of the flexible printed cable connect to a portion of the first signal applying lines of the plurality of signal applying lines on an upper surface of the second part of the flexible printed cable through the plurality of through holes before the flexible printed cable overlaps the driver IC, wherein the flexible printed cable extends in a first direction from the first bend to overlap the driver IC and the flexible printed cable has a second bend to extend past the driver IC in a second direction over a printed circuit board and connects to a touch panel controller, so that the signal applying lines are not contacted with the driver IC.

7. The method of claim 6, wherein the flexible printed cable extends through the driver IC of the display device to be connected to a printed circuit board.

8. The method of claim 6, wherein the signal applying lines for applying signals to the metal electrodes on the upper substrate are printed on the upper surface of the first part of the flexible printed cable, and the signal applying lines for applying signals to the metal electrodes on the lower substrate are printed on the lower surface of the first part of the flexible printed cable.

9. The method of claim 6, wherein the first, second, third, and fourth metal electrodes are connected to first, second, third, and fourth signal applying lines of the plurality of signal applying lines.

10. The method of claim 6, wherein the display device is a liquid crystal display device.

* * * * *